United States Patent [19]
Elkin

[11] 4,066,270
[45] Jan. 3, 1978

[54] NIPPLE CHUCK

[75] Inventor: Robert D. Elkin, Claremont, Calif.

[73] Assignee: Collins Machinery Corporation, Monterey Park, Calif.

[21] Appl. No.: 676,051

[22] Filed: Apr. 12, 1976

[51] Int. Cl.² .............................................. B23B 31/40
[52] U.S. Cl. ...................................... 279/2 R; 82/44; 242/72.1; 269/48.1
[58] Field of Search .............. 279/2 R, 2 A; 269/48.1; 242/72.1; 82/44

[56] References Cited
U.S. PATENT DOCUMENTS

| 573,325 | 12/1896 | Gates | 279/2 X |
|---|---|---|---|
| 1,654,737 | 1/1928 | Kistner | 279/2 X |
| 1,945,621 | 2/1934 | Shaw | 242/72.1 |
| 2,468,867 | 5/1949 | Collins | 279/2 X |
| 3,018,977 | 1/1962 | Skallquist | 279/2 X |

Primary Examiner—Z. R. Bilinsky
Attorney, Agent, or Firm—William W. Haefliger

[57] ABSTRACT

Pipe chucking apparatus comprises:
  a. a tubular mandrel,
  b. driver means to engage the exterior of the mandrel and rotate same,
  c. a work pipe to be rotated relative to a forming tool,
  d. jaws on the mandrel and releasably coupled to the bore of the work pipe,
  e. actuator means within the mandrel to displace the jaws into and out of coupling engagement with the bore of the work pipe.

13 Claims, 6 Drawing Figures

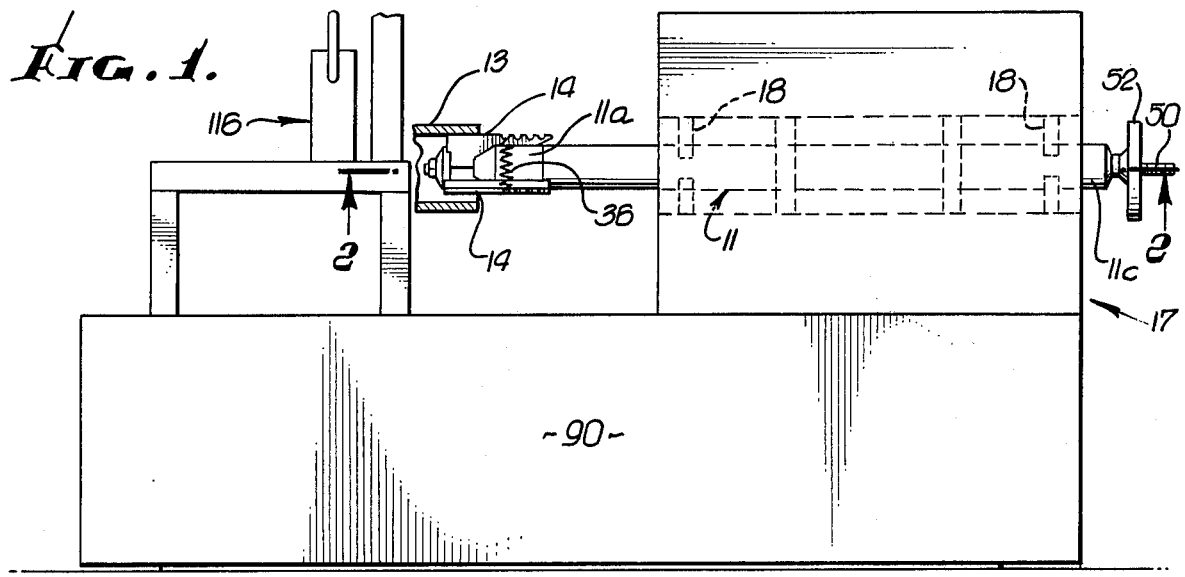
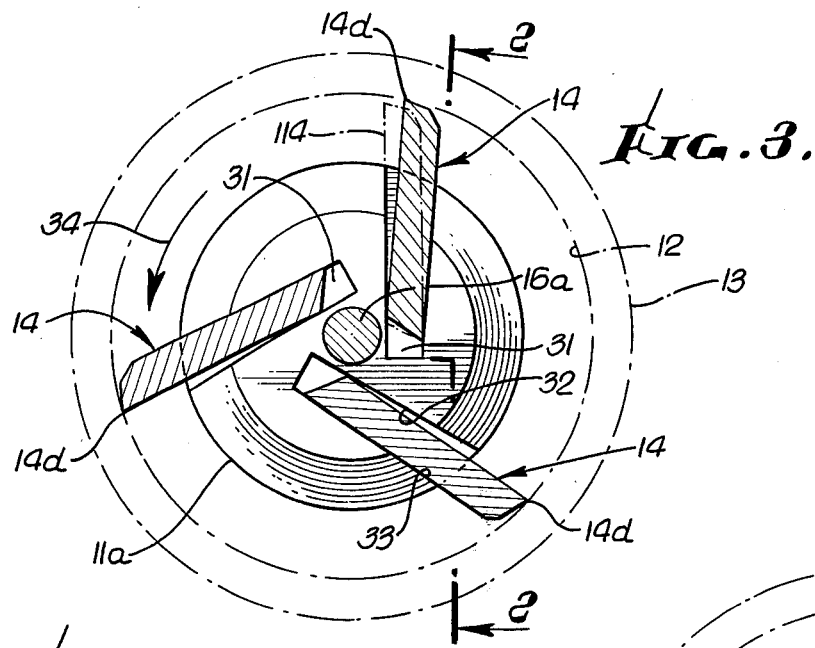
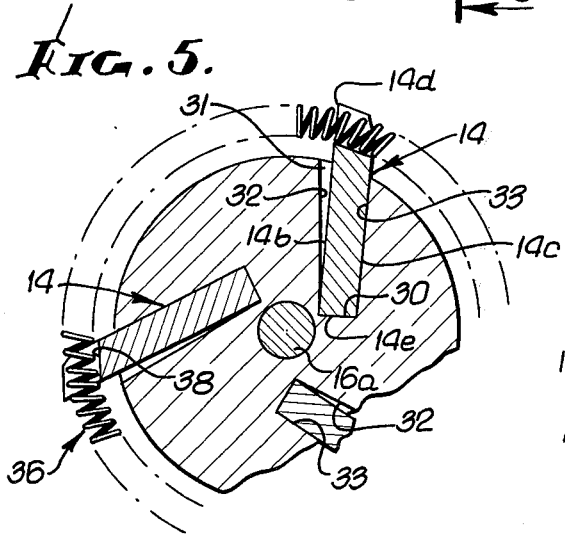
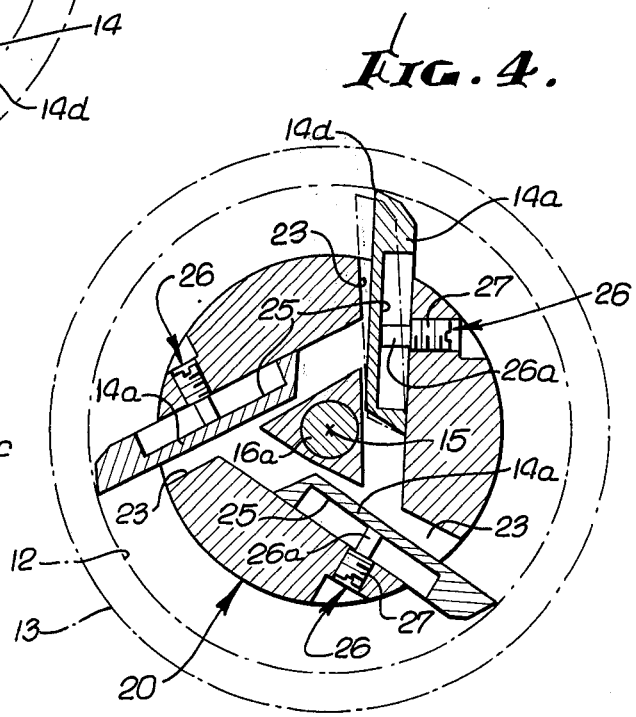

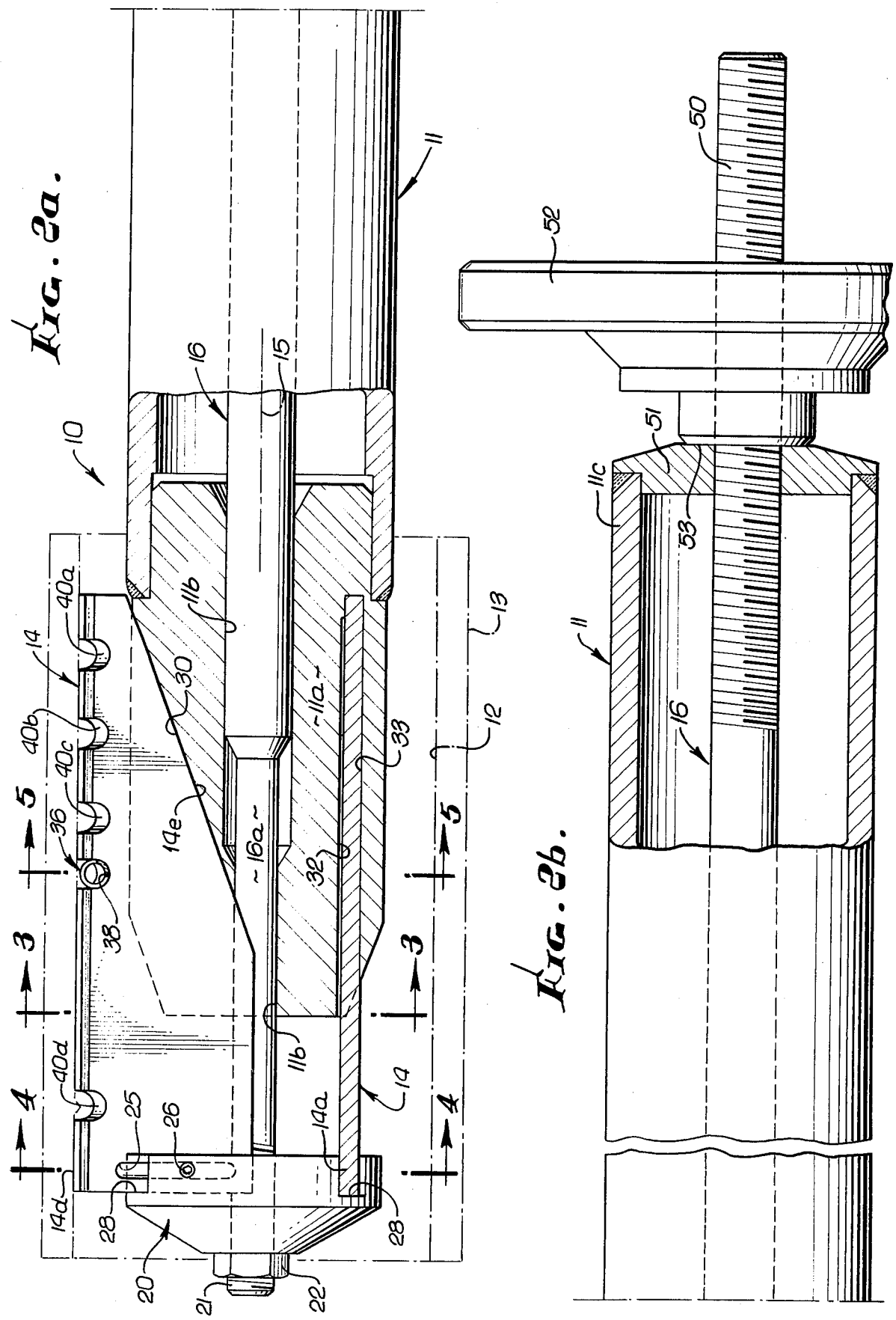

NIPPLE CHUCK

BACKGROUND OF THE INVENTION

This invention relates generally to the supporting and rotating of pipe to be machined or cut; more specifically, it concerns a way to quickly and easily internally support such pipe and without requiring thread connection to same.

In the past, it was the practice to apply an internally threaded adapter to an externally threaded pipe end, the adapter in turn being supported by a mandrel. The objective of course was to achieve centering and rotation of the pipe relative to a machining tool or cutter which was then applied to the rotating pipe. Such practice created problems and disadvantages, in that different adapters were required, one for each pipe size; the pipe was not necessarily threaded to connect to an adapter; and it was difficult to unscrew the adapter from the pipe after positively driving the adapter relatively onto the pipe thread to achieve rotation of the pipe against reverse torque applied by the machining equipment. Insofar as I am aware, no prior pipe chucking equipment embodied the unusually advantageous combinations of structure, function and results as are now afforded by the present invention.

SUMMARY OF THE INVENTION

Basically, the pipe chucking apparatus of the present invention comprises, in combination, a. an axially elongated tubular mandrel receivable within a bore formed by the pipe,
  b. a plurality of jaws spaced about the mandrel axis at the mandrel exterior,
  c. an axially elongated actuator extending within the mandrel and operatively connected with the jaws bodily to displace the jaws axially, and
  d. structure on the mandrel supporting the jaws for radially outward displacement to engage the pipe bore in response to such axial displacement, and for subsequent limited rocking movement of the jaws circumferentially about said axis in response to rotation of the mandrel and jaws relative to the pipe.

As will be seen, the mandrel structure typically includes outwardly presented ramps engaged by interior edges of the jaws, the ramps located at the bottoms of slots in the mandrel sized to permit limited rocking of the expanded jaws about their inner edges to increasingly grip the pipe bore; a retainer on the actuator typically forms other slots into which the ends of the jaws project for retention by tongue and groove elements; the jaws may have peripheral notches to receive a retaining spring urging the jaws inwardly; the jaws may have other groups of peripheral notches to selectively receive a pipe burr so that the burr does not engage the bore gripping outer edges of the jaws; and the actuator projects through the mandrel and has a threaded end engaged by a hand-wheel operable to remotely control expansion and retraction of the jaws in a positive and rapid manner.

These and other objects and advantages of the invention, as well as the details of an illustrative embodiment, will be more fully understood from the following description and drawings, in which:

DRAWING DESCRIPTION

FIG. 1 is a side elevation showing the invention in position for use;

FIG. 2 (including portions 2a and 2b) is an enlarged section on lines 2—2 of FIG. 1;

FIG. 3 is a section taken in elevation on lines 3—3 of FIG. 2;

FIG. 4 is a section taken on lines 4—4 of FIG. 2; and

FIG. 5 is a section taken on lines 5—5 of FIG. 2.

DETAILED DESCRIPTION

As shown in the drawings, the pipe chucking apparatus 10 includes an axially elongated tubular mandrel 11 the left end portion of which is receivable within a bore 12 formed by the pipe 13 to be supported and rotated. The mandrel end portion carries a plurality (as for example three) of jaws 14 which are spaced about the mandrel axis 15 at the mandrel exterior. The jaws are operatively connected with an axially elongated actuator 16 which extends within the mandrel to bodily displace the jaws axially rightwardly in FIG. 2a, as controlled from the rightward end of the mandrel, i.e. remotely from the jaws and from the mandrel rotary drive. Further, structure is provided on the mandrel to support the jaws for radially outward displacement to engage the pipe bore, in response to jaw axial displacement. The support also allows subsequent limited rocking movement of the jaws generally circumferentially about axis 15 in response to rotation of the mandrel and jaws relative to the pipe to increase the grip of the pipe bore by the jaws, thereby centering and positively rotating the pipe so that it can be machined or cut. Note mandrel left end portion 11a defining actuator guiding bore 11b.

In FIG. 1, a means 116 to machine the pipe 13 may for example take the form of a threader or groovers, as disclosed in U.S. Pat. No. 3,820,180. Further, a drive to rotate the mandrel is shown at 17, and includes jaws 18 to engage the mandrel exterior. One such drive is disclosed in U.S. Pat. No. 3,270,592. The machining means 116 and drive 17 may be mounted on a common base 90.

The operative connection between the actuator and jaws may with unusual advantage include a retainer flange 20 affixed to the threaded end 21 of the actuator reduced diameter rod section 16a, as by lock nut 22. The retainer flange forms three slots 23, as better seen in FIG. 4, into which the left ends 14a of the jaws of blades 14 are received in axially leftwardly spaced relation from the previously mentioned jaw displacing mandrel structure. Slots 23 are equally spaced about axis 15 and extend generally radially outwardly from inward locations spaced eccentrically from axis 15. Note also that the slots intersect and are wider than the jaws to allow rocking thereof. Tongue and groove elements are located on the retainer and jaws to block axially endwise parting of the jaws from the retainer upon leftward movement of the retainer to retract the jaws from pipe gripping extended positions. Such elements may comprise grooves 25 in the side faces of the jaw ends, and holders such as set screws 26 having threaded connection at 27 with the retainer body and loosely projecting at 26a into the grooves. Other type holders such as projecting spring arms may be used. The retainer shoulders 28 adjacent slots 23 act to positively displace the jaws rightwardly to extend the jaws, as will appear.

The structure on the mandrel supporting the jaws for radially outward displacement may, with unusual advantage, comprise outwardly presented, axially and radially flaring ramps 30 engaged by the jaws. The ramp surfaces are typically formed at the bottoms of slots 31 formed between circumferentially spaced shoulders 32 and 33, the slots receiving the jaws and the slot widths slightly exceeding the widths of the jaws to permit limited rocking of the jaws, circumferentially. For this purpose, the walls or shoulders 32 and 33 may slightly flare in an outward direction. Note that the jaws have ramp shoulders or edges 14e parallel to and engaging the mandrel ramps 30, and that such ramps extend longitudinally rightwardly, and generally radially or laterally outwardly. The jaw side faces 14b and 14c are respectively engageable with slot side walls 32 and 33, to limit jaw rocking, as described. Inner edges 14e permit jaw rocking as described.

The jaws comprise plates having radially outer portions which taper toward outermost edges at 14d which extend parallel to axis 15. Such edges are adapted to grip or bite into the pipe bore in response to mandrel and jaw counterclockwise rotation (see arrow 34) in FIG. 3. When the mandrel is rotated clockwise in FIG. 3, the jaws tend to rock relatively reversely to the limited extent allowed by the slots 31, permitting the edges 14d to disengage from the pipe bore 12. See the broken line jaw alternate position 114 in FIG. 3. Accordingly, the pipe is disengaged by the apparatus when the mandrel is rotated reversely or clockwise, in FIG. 3. An annular torsional retainer spring 36 is received in peripheral notches 38 formed in the jaws, to urge them toward the bottoms of the slots, and into "free wheeling" positions.

The jaws also define axially spaced groups of peripheral notches, the notches of each group located to be intersected by a plane normal to axis 15. See for example the four groups of notches 40a –40d. Such notches allow placement of a pipe end in any of several positions in which a radially inwardly projecting annular burr on the pipe may be received in the notches of a group, whereby the burr itself will not engage the jaw outer edges 14d and misalign the pipe relative to the cutting tooling 116, nor will the burr cause "false chucking".

Referring to FIGS. 1 and 2b, the actuator 16 has threaded end extent at 50 projecting axially from and beyond a cap 51 at the mandrel right end 11b. An internally threaded rotor or wheel 52 threadably engages the actuator threaded end 50 to advance the actuator axially rightwardly in response to rotor rotation in one direction, the rotor then bearing against the cap 51 at 53. This effects expansion of the jaws to engage the pipe bore, as described. Loosening of the jaws from the pipe bore may be achieved, as by operating the drive reversely and holding the handwheel against rotation. For this purpose, the thread at 50 may be left-handed, for right-handed threading of the work. Left-handed threading of work may be accomplished using apparatus like that described, but having a "mirror image" relationship to same.

I claim:
1. In pipe chucking apparatus,
    a. an axially elongated tubular mandrel receivable within a bore formed by the pipe,
    b. a plurality of jaws spaced about said mandrel axis at the mandrel exterior,
    c. an axially elongated actuator extending radially inwardly of the jaws and axially within the mandrel, the actuator being operatively connected with the jaws and axially movable relative to the mandrel bodily to displace the jaws axially, and
    d. structure on the mandrel supporting the jaws for radially outward displacement to engage the pipe bore in response to said axial displacement, and for subsequent limited rocking movement of the jaws circumferentially about said axis in response to rotation of the mandrel and jaws relative to the pipe.

2. The apparatus of claim 1 wherein said structure includes outwardly presented, axially and radially flaring ramps on the mandrel engaged by the jaws.

3. The apparatus of claim 2 wherein said structure includes circumferentially spaced shoulders on the mandrel forming slots into which radially inner portions of the jaws are received, the widths of said slots exceeding the widths of the jaws to permit said limited rocking of the jaws.

4. The apparatus of claim 3 wherein said ramps define the bottom of said slots, said slots flaring in parallel relation with said ramps.

5. The apparatus of claim 4 wherein the jaws have innermost edges engaging said ramps and said slots have opposite walls which flare outwardly to permit jaw rocking, there being an annular retainer spring urging the jaws inwardly, and there being peripheral notches in the jaws to receive said retainer spring.

6. The apparatus of claim 1 including a retainer on the actuator and forming slots into which the ends of the jaws are received in axially spaced relation to said structure, and tongue and groove elements on the retainer and jaws acting to block axially endwise parting of the jaws from the retainer.

7. The apparatus of claim 6 wherein said tongue and groove elements comprise grooves in the jaws and holders carried by the retainer and projecting into the grooves.

8. The apparatus of claim 6 wherein said actuator has threaded extent projecting from and beyond one end of the tubular mandrel remotely from said jaws and said retainer, and an internally threaded rotor threadably engages the acuator threaded extent to advance the actuator and retainer axially to effect outward displacement of the jaws on the mandrel in response to rotation of the rotor while the rotor is blocked against axial travel.

9. The apparatus of claim 8 including driver means to engage the exterior of the mandrel and rotate the mandrel.

10. The apparatus of claim 1 wherein the jaws comprise plates having radially outer portions which taper to define outermost edges which extend generally parallel to said axis, and radially inner portions which extend parallel to said ramps.

11. The apparatus of claim 10 wherein the jaws define a group of peripheral notches to receive a pipe annular burr, said notches located to be intersected by a plane normal to said axis.

12. The apparatus of claim 10 wherein the jaws define at least two groups of peripheral notches, the notches of each group located to be intersected by a plane normal to said axis so as to receive a pipe annular burr, the groups of notches being axially spaced.

13. In combination,
    a. a tubular mandrel,
    b. driver means to engage the exterior of the mandrel and rotate same, c. jaws on the mandrel and releasably coupled to the bore of a work pipe to be rotated by said jaws,
d. actuator means extending axially within the mandrel and radially inwardly of the jaws and through said driver means to displace the jaws into and out of coupling engagement with the bore of the work pipe, and
e. a hand manipulable rotor on the actuator means at a portion thereof remote from said jaws to advance the actuator axially endwise to effect said jaw displacement,
f. there being structure on the mandrel supporting the jaws for limited rocking movement circumferentially about said axis in response to rotation of the mandrel and jaws relative to the pipe.